United States Patent
Chlebovec

(12) 
(10) Patent No.: US 11,167,383 B2
(45) Date of Patent: Nov. 9, 2021

(54) SYSTEM FOR FASTENING A SEAL TO A ROTOR BLADE OF A ROTARY FEEDER

(71) Applicant: Schenck Process Europe GmbH, Darmstadt (DE)

(72) Inventor: Michal Chlebovec, Poprad-Velka (SK)

(73) Assignee: Schenck Process Europe GmbH, Darmstadt (DE)

( * ) Notice: Subject to any disclaimer, the term of this patent is extended or adjusted under 35 U.S.C. 154(b) by 0 days.

(21) Appl. No.: 16/986,962

(22) Filed: Aug. 6, 2020

(65) Prior Publication Data
US 2020/0361044 A1    Nov. 19, 2020

Related U.S. Application Data

(63) Continuation of application No. PCT/EP2019/051949, filed on Jan. 28, 2019.

(30) Foreign Application Priority Data

Feb. 6, 2018  (CZ) .................................. CZ2018-62
Feb. 6, 2018  (CZ) ......................... CZ2018-34679 U

(51) Int. Cl.
*B23P 19/04*  (2006.01)
*B65G 53/46*  (2006.01)

(52) U.S. Cl.
CPC .......... *B23P 19/04* (2013.01); *B65G 53/4633* (2013.01)

(58) Field of Classification Search
CPC .............................. B23P 19/04; B65G 53/4633
See application file for complete search history.

(56) References Cited

U.S. PATENT DOCUMENTS

| 3,052,383 A * | 9/1962 | Transeau ........... B65G 53/4633 |
| | | 222/345 |
| 3,201,007 A * | 8/1965 | Transeau ........... B65G 53/4633 |
| | | 222/345 |
| 2013/0022700 A1* | 1/2013 | Sauseng ................. A21C 5/003 |
| | | 425/289 |

FOREIGN PATENT DOCUMENTS

| CN | 105236147 A | 1/2016 |
| DE | 1174257 B | 7/1964 |
| DE | 9215690 U1 | 8/1993 |
| DE | 202009002860 U1 | 4/2009 |
| WO | WO2011/120936 A1 | 10/2011 |

OTHER PUBLICATIONS

International Search Report dated Jun. 5, 2019 in corresponding application PCT/EP2019/051949.

* cited by examiner

*Primary Examiner* — Lawrence Averick
(74) *Attorney, Agent, or Firm* — Muncy, Geissler, Olds & Lowe, P.C.

(57) ABSTRACT

A fastening system having a supporting strip, to which is fastened, outside the housing of the rotary feeder, a seal designed to seal the blade of the rotor in relation to the housing. The mounted unit of supporting strip and seal is inserted into a groove devised in the blade. This installation unit is then secured to the blade by means of securing screws. The seal can be made from a hard seal, especially steel, or a soft seal, especially rubberized textile, attached on the outside by a locating strip.

9 Claims, 3 Drawing Sheets

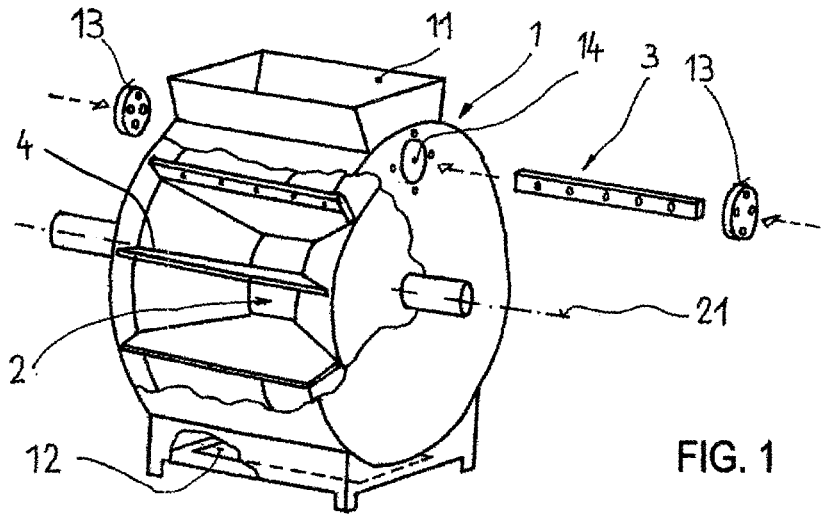
FIG. 1
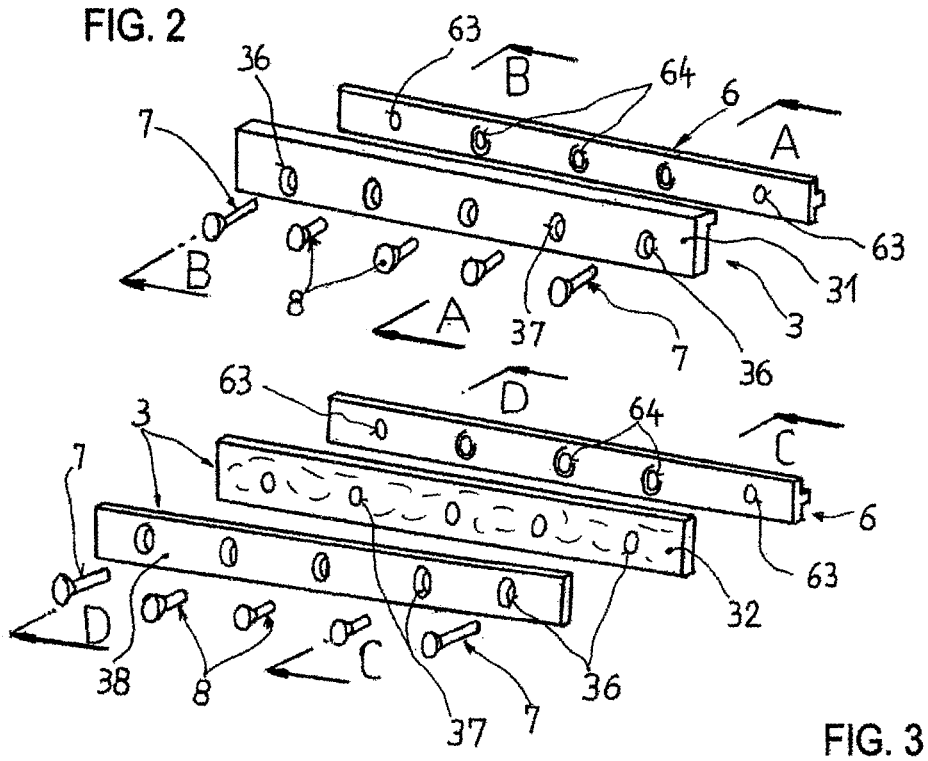
FIG. 2
FIG. 3

SYSTEM FOR FASTENING A SEAL TO A ROTOR BLADE OF A ROTARY FEEDER

This nonprovisional application is a continuation of International Application No. PCT/EP2019/051949, which was filed on Jan. 28, 2019, and which claims priority to Patent Application No. PV 2018-62, which was filed on Feb. 6, 2018 and which claims priority to Patent Application No. PUV 2018-34679, which was filed on Feb. 6, 2018 and which are all herein incorporated by reference.

BACKGROUND OF THE INVENTION

Field of the Invention

The present invention relates to a system for fastening a seal to a rotor blade of a rotary feeder of bulk material, which seal can be a hard seal formed of an abrasion-resistant material or a soft seal formed of a nonabrasive material.

Description of the Background Art

The seals of rotary feeders undergo significant wear and tear, especially when feeding abrasive materials. This requires them to be replaced often. For this purpose, installation holes are arranged in the face flanges of the body of the rotary feeder, being closed up during operation. The dimensions of the installation holes are large enough for a hand to be inserted with appropriate tools to release the seal and then pull it out. A new seal is then mounted in a reverse order.

DE 20 2009 002 860 U1 discloses a system for securing the seal to the blade, based on the fact that the seal is screwed in place with the aid of force-locking screws. The mounting technique involves inserting a new seal via one of the installation holes into the internal space of the rotary feeder and fixing the two-part seal with a strip with force-locking screws. These screws are passed through positioning holes and screwed into anchor holes made in the blade.

This is inconvenient work, since it takes place in a tight space. Besides this drawback of the known fastening system, a precise alignment of the seal with the body is difficult to achieve and depends on the touch and manual dexterity of the worker performing the installation. The inaccuracy is caused in the clearance required from the seal, during its positioning. The seal is guided only by the force-locking screws.

In an improved version of this fastening system, the seal is centred by means of pins and then secured by the force-locking screws. While the precision of positioning the seal is greater in this version, the inconvenience involved in its replacement still remains.

SUMMARY OF THE INVENTION

It is therefore an object of the present invention to significantly reduce the drawbacks of a system of fastening a seal to a rotor blade of a rotary feeder.

In an exemplary embodiment a system is provided that includes a hard seal of abrasion-resistant material or a soft seal of nonabrasive material, against which a supporting strip is pressed in the direction of the blade. The seal secured to the blade has a sealing edge located above the top edge of the blade. The essence of the invention is that, below the top edge of the blade, a groove is formed in the wall of the rotor blade. The groove is substantially parallel with the axis of the rotor. The supporting strip is inserted into the groove by sliding. The shape of the supporting strip's first contact surface basically matches the shape of the groove. The rear side of the supporting strip is provided with a second contact surface, against which a contact surface of the seal rests. At both ends of the groove there are formed at least two anchor holes in the rotor blade, which are adapted to the fastening of securing screws. Through holes are made in the supporting strip, which are concentric with the anchor holes when the support strip is fully inserted into the groove. Through holes are formed in the seal, too, which fits to the anchor holes in the blade and the through holes in the supporting strip. On the side opposite the contact surface the seal's through holes are provided with a conical recess with a similar conicity as the conical heads of the securing screws. When the supporting strip with the seal is inserted into the groove and the securing screws are tightened, a rigid unit is formed by the seal and blade.

The benefit of the indicated arrangement is that the seal may be easily pushed into the blade by means of the groove and then fixed to the blade by means of the securing screws. Another benefit is the accurate fit of the seal in the blade, thus precisely limiting its position relative to the body of the rotary feeder.

The groove can have a concave shape or the shape of a dovetail. In the radial direction from the axis of the rotor to the back side of the blade the groove has an oblique bottom surface, pointing radially inward towards the centre or axis of the rotor at a slant from the wall of the blade. A bottom surface parallel to the blade surface adjoins the oblique bottom surface at least up to the area beneath the anchor holes. Above the anchor holes there is formed an oblique top surface with opposite inclination to that of the oblique bottom surface. The oblique top surface is adjoined at an acute angle by a normal top surface, which is parallel to the normal bottom surface.

In such a groove, the strain is transmitted from the seal to the blade by the groove based on an interlocking form of the seal, supporting strip and the groove. Therefore only two securing screws are sufficient for fastening the seal to the blade, one at either end of the seal. This significantly facilitates the installation of the seal.

An easier fabrication of the blade with the groove is made possible by a modification in which the normal bottom surface is in the same plane as the normal top surface.

Depending on the properties of the bulk material, forces are transmitted from the seal to the blade which, if secured by only two securing screws, might in some instances result in its deformation. In order to increase the rigidity of the seal, threaded holes are arranged in the supporting strip for fastening screws. For these fastening screws, installation holes are arranged in the seal that are provided with a conical recess having a similar conicity as the conical bevelled heads of the fastening screws. The length of the fastening screws is less than the total thickness of the seal and the supporting strip together. Besides assisting in the transfer of force from the seal to the blade, this modification has the advantage that a single part may be formed from the seal and supporting strip, outside the interior of the rotary feeder, which is secured to the blade in the above described manner.

If the seal is formed as a hard seal, a modification can be used for its precise fitting relative to the supporting strip, wherein the seal is provided with a nose in the radial direction from the axis of the rotor. The bearing surface of the nose of the supporting strip rests against a tangential surface of the supporting strip in relation to the axis of the rotor.

In order to press this seal against the supporting strip and the supporting strip against the corresponding surfaces of the groove, the distance of the axis of the conical recess from the bearing surface is less than the distance of the axis of the through hole from the tangential surface. The two axis can have a first eccentricity amounting to 5 to 15% of the diameter of the securing screw.

A similar effect may be accomplished when mounting a hard seal on a supporting strip arranged separately outside the interior of the rotary feeder. For this purpose, the distance of the axis of the conical recess from the bearing surface is less than the distance of the axis of the threaded hole from the tangential surface. The two axis can have a second eccentricity amounting to 5 to 15% of the diameter of the fastening screw.

In order to increase the effect of the latter mentioned modifications, the dimensions of the conical recess for the securing screws are the same as those of the conical recess for the fastening screws. Moreover, the dimensions of the conical heads of the securing screws are the same as those of the conical bevelled heads of the fastening screws. At the same time, the first eccentricity dictated by the distance of the axis of the conical recess for the securing screws from the bearing surface is the same as the second eccentricity dictated by the distance of the axis of the conical recess for the fastening screws from the bearing surface.

The fastening system according to the invention, both in its basic embodiment and in its improving modifications, significantly improves the replacement of the seals of rotary feeders of bulk material.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is an axonometric view of the rotary feeder,

FIG. 2 is an axonometric view on enlarged scale of the seal formed by a hard seal and a supporting strip, FIG. 3 on the same scale as FIG. 2 is an axonometric view of the seal formed by a soft seal with locating strip and supporting strip.

DETAILED DESCRIPTION

Figure 4:
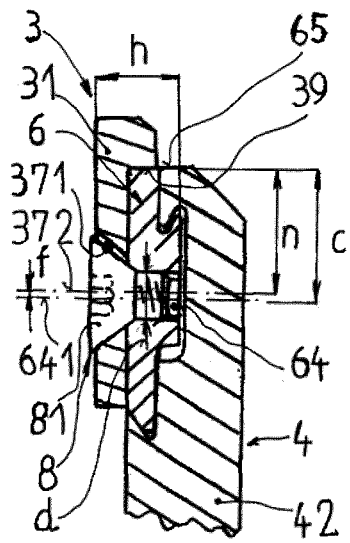
FIG. 4 is the cross section A-A of FIG. 2 on an enlarged scale as compared to FIG. 2.

The rotary feeder (FIG. 1) comprises a body or housing 1, in which a rotor 2 is rotary mounted. The drive mechanism of the rotor is not shown. The rotor 2 comprises blades 4, which carry the bulk material upon rotation from an inlet opening 11 to an outlet opening 12. The rotor 2 is sealed off against the housing 1 by seals 3, which are fastened to outer margins of the blades 4. The seals 3 have a sealing edge 35 located above the top edge 41 of the blade 4. At the face flanges of the housing 1 insertion openings 14 are arranged, which serve for replacing the seal 3. During the operation of the rotary feeder, the insertion openings 14 are closed by covers 13.

The seal 3 is formed by an element from the group comprising on the one hand a hard seal 31 of abrasion-resistant material and on the other hand a soft seal 32 of nonabrasive material. For abrasive bulk materials, it is advisable to use abrasion-resistant steel to provide the hard seal 31. For other bulk materials soft seals 32, as made of rubberized textile are sufficient. In order to ensure sufficient rigidity, a locating strip 38 is attached to the soft seal 32 in the way that will be described below.

Figure 6:
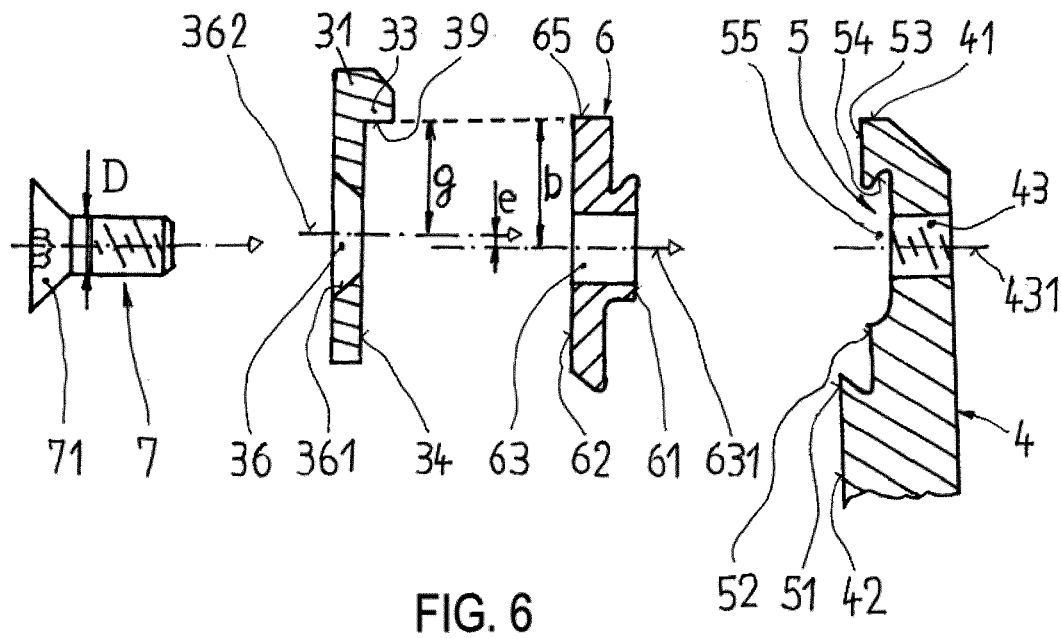
FIG. 6 shows individual components of FIG. 5 in disassembled form.
Figure 9:
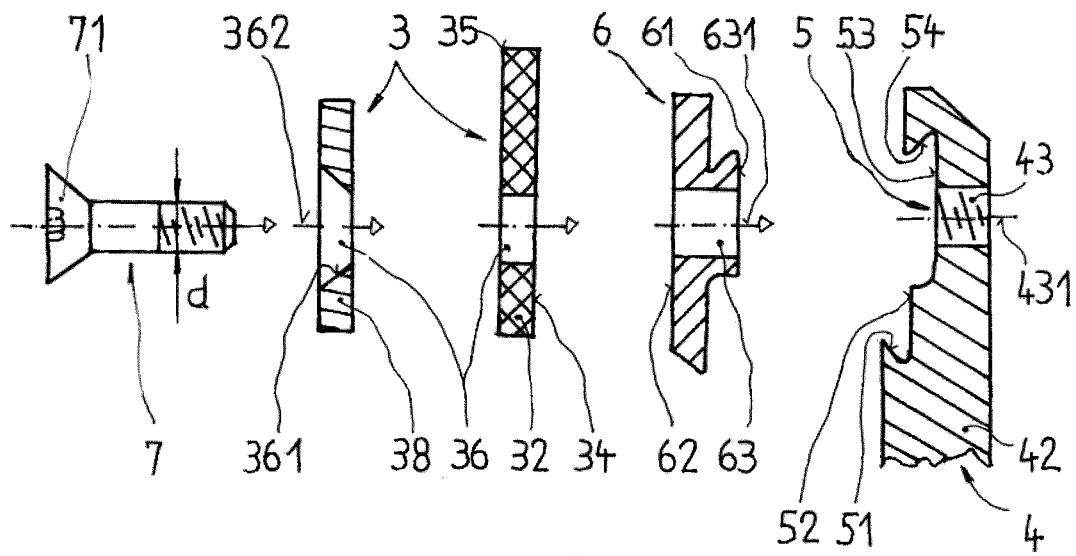
FIG. 9 shows individual components of FIG. 8 in disassembled form.

Beneath the top edge 41 of the blades 4, on their back side 41, there is formed a groove 5 in their wall 42 being parallel with the axis 21 of the rotor 2. The groove 5 may have a concave cross section. In an advantageous embodiment (FIG. 6, 9), the groove 5 has two-tiered dovetail shape. The two-tiered dovetail comprises, in the radial direction from the axis 21 of the rotor 2 to the backside 41 of the blade 4, an oblique bottom surface 51 pointing radially inward from the blade 4 in relation to the axis 21. The oblique bottom surface 51 is adjoined at least as far as the area beneath the anchor holes 43 by a normal bottom surface 52. Above the anchor holes 43 there is formed an oblique top surface 54 with the opposite inclination to that of the oblique bottom surface 51. The oblique top surface 54 is adjoined at an acute angle by a normal top surface 53, which is parallel with the normal bottom surface 52. In the example of FIGS. 6 and 9, the normal bottom surface 52 is in the same plane as the normal top surface 53. In this way, there is formed in the groove 5 a pocket 55. In an alternative not shown, the groove has a dovetail shape. This means that the normal bottom surface 52 may be adjoining the oblique top surface 54, so that there is no additional pocket 55 formed.

In the fastening system, a support strip 6 is inserted by sliding it into the groove 5. The support strip 6 has on its first contact surface 61 in direction towards the rotor blades 4 a protruding channel which fits substantially to the shape of the groove 5. The rear side of the supporting strip 6 is provided with a second contact surface 62, against which rests the contact surface 34 of the seal 3.

Figure 5:
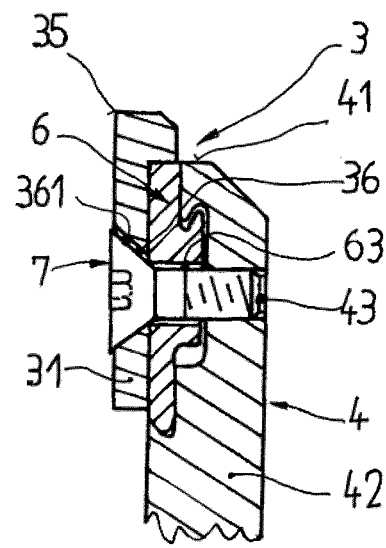
FIG. 5 is the cross section B-B of FIG. 2 on an enlarged scale as compared to FIG. 2.

At each end of the groove 5 there is formed in the blade 4 at least one anchor hole 43 adapted to adjust the securing screws 7 (FIG. 5, 8). Therefore the anchor holes 43 are provided with threads. Another option for the fastening the securing screws 7 involves the use of nuts. Through holes 63 are arranged in the supporting strip 6, which are concentric with the anchor holes 43 when the supporting strip 6 is fully inserted into the groove 5. The seal 3, whether made as a hard seal 31 or as an soft seal 32 and locating strip 38, is provided with locating holes 36 with an arrangement similar to that of the anchor and through holes 43, 63.

On the side opposite the seal's 3 second contact surface 34 the locating holes 36 are provided with a conical recess 361 with a similar conicity to that of the conical heads 71 of the securing screws 7 (FIG. 6, 9).

Further, threaded holes 64 are arranged in the supporting strip 6 for fastening screws 8, for which installation holes 37 are produced in the seal 3 and provided with a conical recess 371. The conical recess 371 has a similar conicity to that of the conical bevelled heads 81 of the fastening screws 8. The length m of the fastening screws 8 is less than the total h of the thickness of the seal 3 and supporting strip 6 (FIG. 4, 7).

The embodiment described thus far pertains to both a seal 3 made of hard seal 31 and a seal 3 containing a soft seal 32. In the event that the seal 3 is formed by a hard seal 31, which is illustrated in one advantageous embodiment in FIGS. 4, 5 and 6, it is provided with a nose 33 with bearing surface 39 in the same plane as the top edge 41 of the rotor blade 4 and/or the tangential surface 65 of the supporting strip 6. The bearing surface 39 rests against the tangential surface 65 formed on the supporting strip 6 in the relation to the axis 21 of the rotor 2.

In the application of a seal 3 containing a soft seal 32, the axis 431 of the anchor hole 43 is identical to the axis 362 of the conical recess 361 and to the axis 631 of the through hole 63 (FIG. 9). In the application of the seal 3 made of a hard seal 31, a similar embodiment can be employed, but it is more advantageous to depart from this identity of the axes (FIG. 6) in that the distance g of the axis 362 of the conical recess 361 from the bearing surface 39 is less than the distance b of the axis 631 of the through hole 63 from the tangential surface 65 by a first eccentricity e amounting to 5 to 15% of the diameter D of the securing screw 7.

Figure 7:
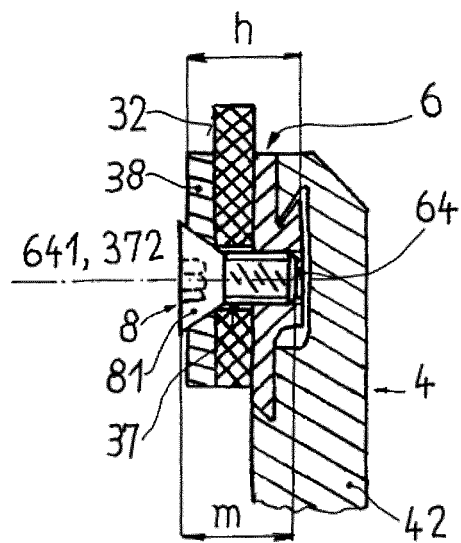
FIG. 7 is the cross section C-C of FIG. 3 on an enlarged scale as compared to FIG. 3.
Figure 8:
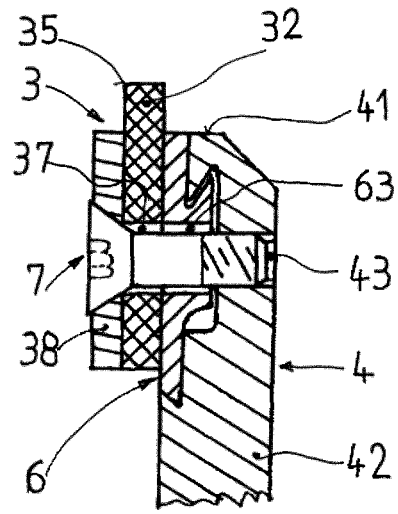
FIG. 8 is the cross section D-D of FIG. 3 on an enlarged scale as compared to FIG. 3.

The fastening of the seal 3 to the supporting strip 6 is arranged in similar manner. When using a seal 3 with a soft seal 32, the axis 641 of the threaded hole 64 is identical to the axis 372 of the conical recess 371 (FIG. 7). If a hard seal 31 is used, resting by its nose 33 against the tangential surface 65 of the blade 4, it is advisable for the distance n of the axis 372 of the conical recess 371 from the bearing surface 39 to be less than the distance c of the axis 641 of the threaded hole 64 from the tangential surface 65 by a second eccentricity f amounting to 5 to 15% of the diameter d of the fastening screw 8 (FIG. 4).

For the transfer of forces, it is advantageous when the dimensions of the conical recess 361 for the securing screws 7 are the same as those of the conical recess 371 for the fastening screws 8, and the dimensions of the conical heads 71 of the securing screws 7 are the same as those of the conical bevelled heads 81 of the fastening screws 8. In this case, the first eccentricity e is the same as the second eccentricity f.

When replacing the seal 3, first of all the cover 13 is removed from the housing 1 and the blade 4 is turned toward the insertion opening 14. After this, the securing screws 7 are loosened on each end of the seal 3 and the seal 3 with the supporting strip 6 are removed from the groove 5. The seal 3 is released from the supporting strip 6 by unscrewing the fastening screws 8.

When mounting a new seal 3, at first a rigid unit is produced, formed of the supporting strip 6 and either a hard seal 31, or an soft seal 32 attached by a locating strip 38. To produce this rigid unit, fastening screws 8 (FIG. 2, 3) are passed through installation openings 37 and screwed into threaded holes 64 in the supporting strip 6. If the seal 3 comprises a hard seal 31 with a nose 33 and if it contains a conical recess 371 shifted by the second eccentricity f with respect to the axis 641 of the threaded hole 64 (FIG. 4), after the tightening of the fastening screws 8 the bearing surface 39 of the nose 33 is pressed against the tangential surface 65 of the supporting strip 6.

If the seal 3 doesn't comprise a hard seal 31 having an eccentric displacement of the conical recess 371 of the installation opening 37, or in the event of a seal 3 comprising a soft seal 32 and a locating strip 38, the self-locating effects are limited to the pressure from the tightened fastening screws 8 to the supporting strip 6.

After assembling the rigid unit made of seal 3 and supporting strip 6, it is inserted by the insertion opening 14 into the groove 5 in the blade 4 of the rotor 2. The securing screws 7 are passed through the locating holes 36 in the seal 3 and the through holes 63 in the strip 6 and are screwed into the anchor holes 43 in the blade 4. If in a seal 3 made from a hard seal 31 the conical recess 361 is offset by the first eccentricity e, the tightening of the securing screws 7 on the one hand ensures the connection between seal 3 and supporting strip 6 and on the other hand the supporting strip 6 is pressed not only against the normal bottom and top surfaces 52, 53, but also against the oblique bottom surface 51. This configuration is important both to assure a precise position of the seal 3 and a reliable transfer of forces during the operation in both directions of turning of the rotor 2.

If the seal 3 does not have an eccentrically displaced conical recess 361, the force effects are similar to those in the case of no displacement of the conical recess 371 of the installation opening 37.

After mounting the seal 3, the cover 13 is secured to the housing 1 and the rotary feeder is ready to operate.

INDUSTRIAL UTILITY

The system for fastening a seal 3 to the blade 4 of a rotor 2 will find application especially in rotary feeders of bulk material. After technical modifications, it could also be used in other rotary machines, such as planer machines.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for fastening a seal to a rotor blade of a rotary feeder,
    which comprises a housing with an insertion opening in each face flange, the method comprising:
    assembling an installation unit formed of a supporting strip and the seal,
    the seal being either a hard seal or a soft seal with a locating strip,
    wherein either the hard seal or the soft seal with the locating strip are attached to the supporting strip by at least one fastening screw;
    inserting the installation unit,
    with the seal already attached to the supporting strip by the at least one fastening screw,
    through the insertion opening and into a groove of the rotor blade;
    securing the installation unit to the rotor blade by at least one securing screw,
    wherein the locating strip, the supporting strip, and the rotor blade are all separate parts.

2. The method according to claim 1, wherein the at least one securing screw is passed through a through hole in the seal and a through hole in the supporting strip and is screwed in an anchor hole provided in the groove of the rotor blade, wherein a respective one of the anchor hole is provided at each end of the groove.

3. The method according to claim 1, wherein the groove comprises, in a radial direction from the axis of the rotor to the top edge of the rotor blade, an oblique bottom surface, pointing radially inward towards the axis of the rotor at a slant from a wall of the rotor blade, wherein a normal bottom surface adjoins the oblique bottom surface at least up to an area beneath the anchor holes, wherein above the anchor holes there is formed an oblique top surface with opposite inclination to that of the oblique bottom surface, and wherein the oblique top surface is adjoined at an acute angle by a normal top surface, which is substantially parallel to the normal bottom surface.

4. The method according to claim 3, wherein the normal bottom surface is in the same plane as the normal top surface.

5. The method according to claim 1, wherein the at least one fastening screw, that attaches the seal to the supporting strip to form the installation unit, extends fully through the seal and partially through the supporting strip.

6. A method for replacing a seal from a rotor blade of a rotary feeder,
which comprises a housing with an insertion opening in each face flange, the method comprising:
removing a cover from the insertion opening,
rotating the rotor so that the rotor blade is aligned with the insertion opening,
loosening securing screws provided on each end of the seal that attach the seal to the rotor blade,
the seal being either a hard seal or a soft seal with a locating strip,
the seal being either a hard seal or a soft seal with a locating strip (38),
removing the seal from a groove provided in the rotor blade,
wherein the seal has a supporting strip attached thereto by fastening screws, and
after removing the seal from the groove provided in the rotor blade, releasing the seal from the supporting strip by loosening the fastening screws,
wherein the locating strip, the supporting strip and the rotor blade are all separate parts.

7. The method according to claim 6, wherein the groove comprises, in a radial direction from the axis of the rotor to the top edge of the rotor blade, an oblique bottom surface, pointing radially inward towards the axis of the rotor at a slant from a wall of the rotor blade, wherein a normal bottom surface adjoins the oblique bottom surface at least up to an area beneath the anchor holes, wherein above the anchor holes there is formed an oblique top surface with opposite inclination to that of the oblique bottom surface, and wherein the oblique top surface is adjoined at an acute angle by a normal top surface, which is substantially parallel to the normal bottom surface.

8. The method according to claim 7, wherein the normal bottom surface is in the same plane as the normal top surface.

9. The method according to claim 6, wherein the fastening screws, that attach the seal to the supporting strip, extend fully through the seal and partially through the supporting strip.

* * * * *